Aug. 20, 1968     W. TUTTLE     3,397,737
FOUNDRY MOLD CONVEYING APPARATUS WITH PNEUMATIC
DIAPHRAGM CLAMPING MEANS
Filed Aug. 3, 1965     5 Sheets-Sheet 1

INVENTOR
WAINWRIGHT TUTTLE,
BY *Yungblut, Melville, Strasser and Foster*
ATTORNEYS United States Patent Office 3,397,737
Patented Aug. 20, 1968

3,397,737
FOUNDRY MOLD CONVEYING APPARATUS WITH PNEUMATIC DIAPHRAGM CLAMPING MEANS
Wainwright Tuttle, Cincinnati, Ohio, assignor to Altamil Corporation, Indianapolis, Ind., a corporation of Delaware
Filed Aug. 3, 1965, Ser. No. 476,970
12 Claims. (Cl. 164—327)

ABSTRACT OF THE DISCLOSURE

Casting conveyor including circular carrier having several mold clamping fixtures each utilizing a pneumatic diaphragm clamping apparatus mounted thereon, wherein the clamping fixtures are sequentially tiltable from a horizontal loading position to a vertical pouring position, and the clamping mechanism actuated, as the carrier rotates. The fixtures are returned to the horizontal position and unclamped when the fixture reaches a discharge station.

Cross reference to related applications

This invention relates to metal founding and to an improved apparatus for use in the casting of metal. It has great and particular utility in conjunction with the method and apparatus disclosed in United States Letters Patents Nos. 3,181,207 and 3,181,213, both dated May 4, 1965, to achieve an integrated, fully automatic founding system.

More particularly, the invention of the two Letters Patent referred to above contemplates a fully automatic machine for preparing, coring, and closing collapsible sand molds; the invention of this application is directed to a machine which will receive the completed molds, and efficiently expedite the production of castings from these molds.

Background of the invention

It is a principal object of this invention and of the entire foundry system to provide apparatus whereby the objects cast are of superior uniformity of dimension, and wherein the entire operation is carried out with superior economy.

In order to achieve the principal objects briefly noted above, it is a further object of the invention to provide apparatus:

(1) to clamp the cope and drag molds together, with nearly uniform force on all areas of the mold backs for a perfect match at the parting faces in spite of slight departures from parallelism of parting faces or mold backs so that castings have accurate dimensions across the parting line and no flash;
(2) to clamp the cope and drag molds together with high force without the use of cumbersome weights or troublesome mechanical clamping devices;
(3) to clamp the cope and drag molds together in any desired position for pouring with a simple fixture;
(4) to provide an apparatus which is highly reliable in an environment of sand, dust, smoke and corrosive fumes;
(5) to combine in one simple structure the multiple functions of advancing the mold clamping face into contact with the mold, applying clamping force, distributing the force uniformly, and upon unclamping, retracting the clamping face far enough to permit easy withdrawal of one mold and acceptance of another mold;
(6) to rotate the molds and fixtures to any desired pouring position from horizontal to vertical;
(7) to accept an assembled mold from and permit discharge to walking beam conveyors without any sliding motion and to permit free venting of gases from the mold faces;
(8) to move the mold clamping stations intermittently from the mold accepting station to the pouring station and thence to the mold discharge station with smooth motions and sufficiently accurate positioning;
(9) to permit rapid adjustment of the fixtures for running molds of different thickness;
(10) to make maximum use of the number of clamping fixture stations by permitting the molds to travel around a circular path almost twice, in order to take advantage of the otherwise inactive fixtures from the unloading to the loading stations; and
(11) to provide an economical structure and mechanism for the above purposes appropriate for the comparatively low accuracy of positioning required.

Various other objects and advantages of this invention will be readily apparent to the skilled worker in the art as this specification proceeds. Reference will be made from time to time to the accompanying drawings which specifically illustrate certain embodiments of the invention, and in which:

Summary of the invention

Briefly considered, this invention contemplates a rotary mold conveying apparatus including a plurality of mold clamping fixtures. The design of these clamping fixtures is a very important facet of this invention and will be described in great detail hereinafter. For the present, each of these mold clamping fixtures will be traversable from a mold receiving station to a pouring station, through a plurality of cooling positions, and ultimately to a discharge station. At the mold reciving station, a completed sand mold will be placed in the fixture by means which do not form a part of this invention. Once the mold is set in place, the fixture will automatically clamp the cope and drag mold halves together with a high and uniform clamping force. After the mold parts are clamped, the mold may be tilted from the horizontal position in which it is received to the vertical position, so that it can be presented to the pouring station in this latter position. The mold and clamping fixture remain in the vertical position until immediately before discharge. During movement between the last cooling station and the discharge station, the clamping fixture will be tilted back to its horizontal position, and the fixture will unclamp, permitting removal of the filled mold by other means which, again, do not form a part of this invention.

Description of the preferred embodiment

Figure 1:
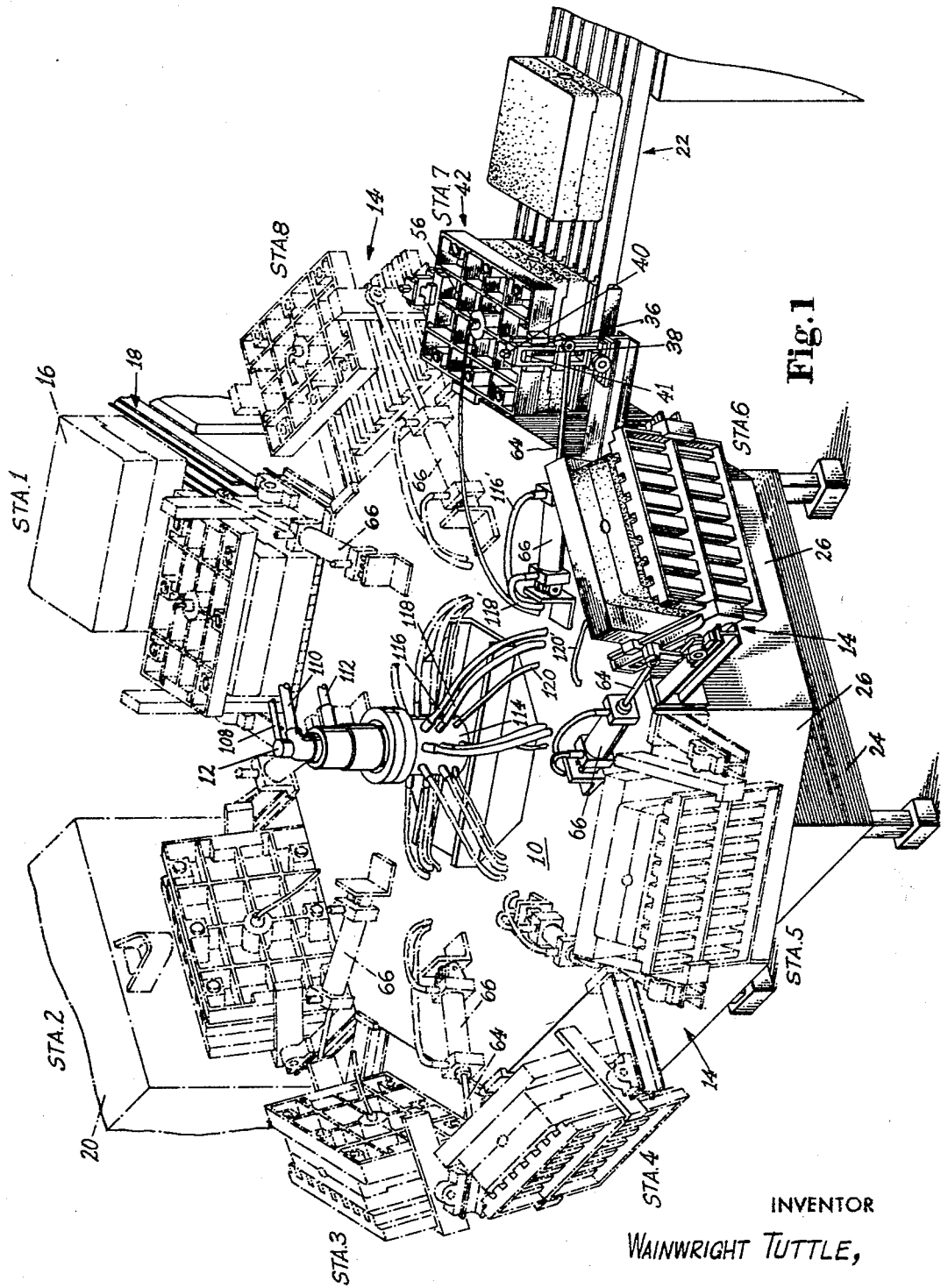
FIGURE 1 is a perspective view showing one embodiment of the invention.

Referring now to FIGURE 1, one embodiment of the casting conveyor of this invention has been shown in perspective. It includes the octagonal, traversable carrier indicated at 10 which is rotatable about an axis indicated generally at 12. Secured to the periphery of the carrier 10 are the plurality of mold receiving and clamping fixtures indicated generally at 14. Each of these mold receiving and clamping fixtures is movable in sequence through the numbered stations 1 through 8 identified in this figure.

At station 1, a completed, assembled two part sand mold 16 is carried by the walking beam conveyor 18 and placed in the mold clamping fixture presently at station 1. Upon wtihdrawal of the tines of the walking beam conveyor, a limit switch is actuated which will initiate a sequence of operations moving the carrier and each mold receiving fixture to the next successive station. Movement of the carrier will in turn actuate additional means through which the mold is tightly clamped in the mold receiving fixture, and thereafter tilted to the substantially vertical position (actually approximately 10° from vertical) shown in stations 2 through 6.

Arrival of each mold receiving fixture at station 2 will actuate an automatic pouring device schematically illustrated in FIGURE 1 at 20. This pouring machine does not form a part of the instant invention, and hence will not be described in this application.

The intermittent motion of the carrier 10 and mold receiving fixtures 14 continues, so that the poured mold passes from station 2 through stations 3, 4, 5 and 6, during which time the molten metal cools and solidifies sufficiently to retain its shape.

Movement of each fixture from station 6 to station 7 activates other means which in sequence tilt the mold receiving fixture 14 back to the horizontal position, and unclamp it, so that the walking beam conveyor 22 may unload the poured mold.

The precise structure of the carrier itself is easily within the purview of the ordinarily skilled worker in the art. In the present embodiment, the carrier or platform 10 will be pivotally mounted on a suitable base structure 24. The base structure 24 will have a substantially flat top surface (not shown in FIGURE 1, but see 68 in FIGURE 4) on which may ride rollers or casters suitably secured to the underside of the carrier 10. The carrier 10 of course will be rotatably mounted over a suitable central axis such as indicated generally by the numeral 12. Many of the components to be described in more detail hereinafter will be mounted between the top surface of the base 24 and the undersurface of the carrier or platform 10, and to protect these elements from the sand and the like of the typical foundry, the depending skirts 26 may be secured to the periphery of the carrier 10.

Figure 2:
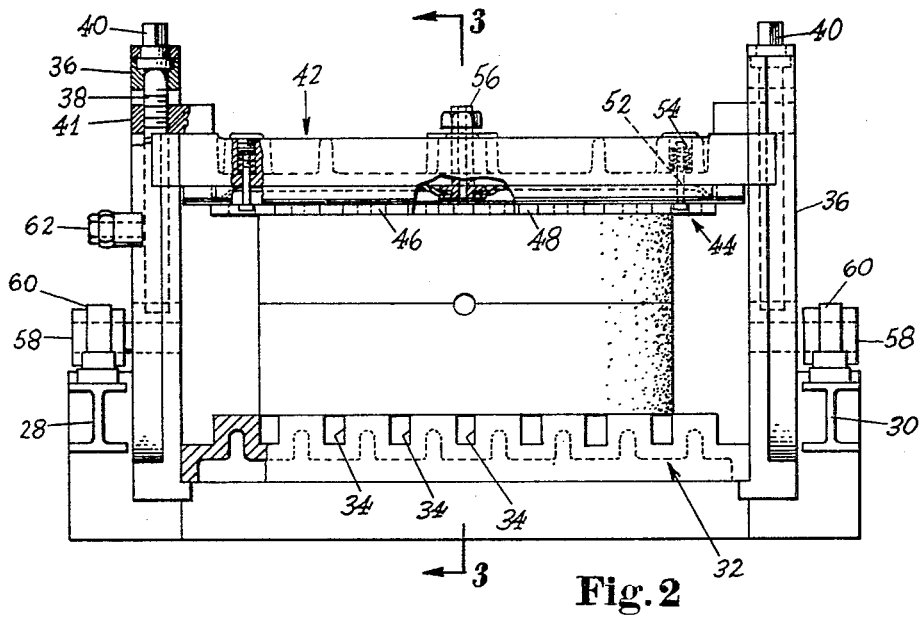
FIGURE 2 is an end elevational view of one of the mold clamping fixtures of FIGURE 1.
Figure 3:
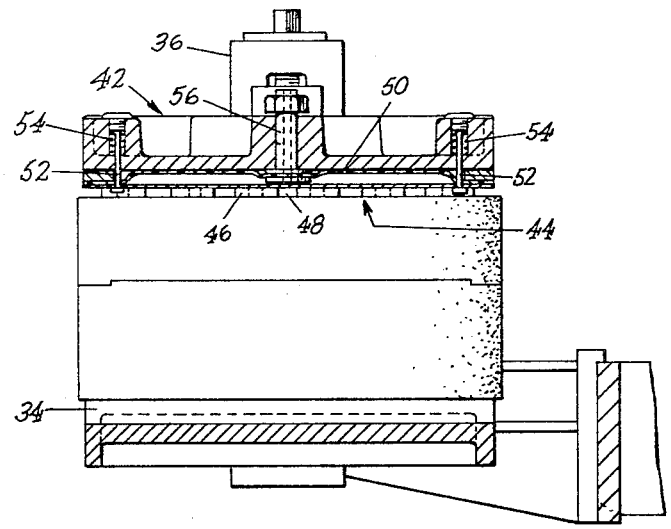
FIGURE 3 is a cross sectional view along the line 3—3 of FIGURE 2.

Turning now to FIGURES 2 and 3, the mold receiving and clamping fixtures will be described in more detail. Each of these fixtures is pivotally mounted on the arms 28 and 30 which extend outwardly from the periphery of the carrier 10. Each fixture includes the base 32, which, according to the present embodiment of the invention, includes a plurality of milled slots 34 which are adapted to receive the tines of the walking beam conveyors 18 and 22 in loading and unloading respectively.

Suitably secured to the side edges of the base 32 are the upstanding side members 36. As will be seen in FIGURE 1 or the left hand upper portion of FIGURE 2, the side members 36 each include the adjusting rod 38 having a head 40 adapted to be engaged by a suitable wrench. Ears 41 from the hollow upper clamping member indicated generally at 42 are threadedly engaged on the rod 38 whereby the hollow upper clamping member 42 may be normally maintained in fixed, spaced apart relation to the base 32. The distance by which the base 32 and upper clamping member 42 are separated may be varied to accommodate different sized molds by suitable adjustment to the rods 38.

Secured to the lower surface of the upper clamping member 42 will be the diaphragm means indicated generally at 44. This diaphragm means includes the elastically bendable clamping platen 46 which may be provided with a plurality of depending buttons 48. Secured to the periphery of the platen 46, and securing this platen to the hollow upper clamping member 42 is the resilient material 50 which may be of rubber or of any other suitable elastomer.

Extending between the clamping platen 46 and the upper clamping member 42 will be a plurality of pins 52 which are spring biased as at 54 to hold the clamping platen against the lower surface of the upper clamping member 42. Holding the clamping platen against the clamping member 42 (a condition not shown in the drawings) will permit introduction of an assembled mold by the walking beam conveyors. Once the completed mold has been set in place on the base 32, air under pressure is introduced through the tube 56 into the space between the elastomer 50 and the clamping platen 46, forcing the latter down against the top surface of the mold, and clamping the mold securely against the base 32.

It will be understood that by the phrase "elastically bendable" as applied to the clamping platen 46, applicant is referring to a thin plate of steel or the like, which, though normally rigid, may be deformed slightly under pressure of the air entering the tube 56 to accommodate the contour of the mold being clamped in place.

It will be readily apparent that both of the side members 36 are provided with the outwardly extending pins 58 which are received in suitable bearing structures 60 secured to the arms 28 and 30. One of the side members 36 also carry the outwardly extending lug 62 which will be secured to the piston 64 of an hydraulic cylinder 66 (see FIGURE 1). By extending or retracting the piston 64 of the cylinder 66, the entire mold receiving fixture can be tilted from the horizontal position shown at stations 1, 7, and 8 of FIGURE 1 to any desired position including the substantially vertical position shown at stations 2–6.

Figure 4:
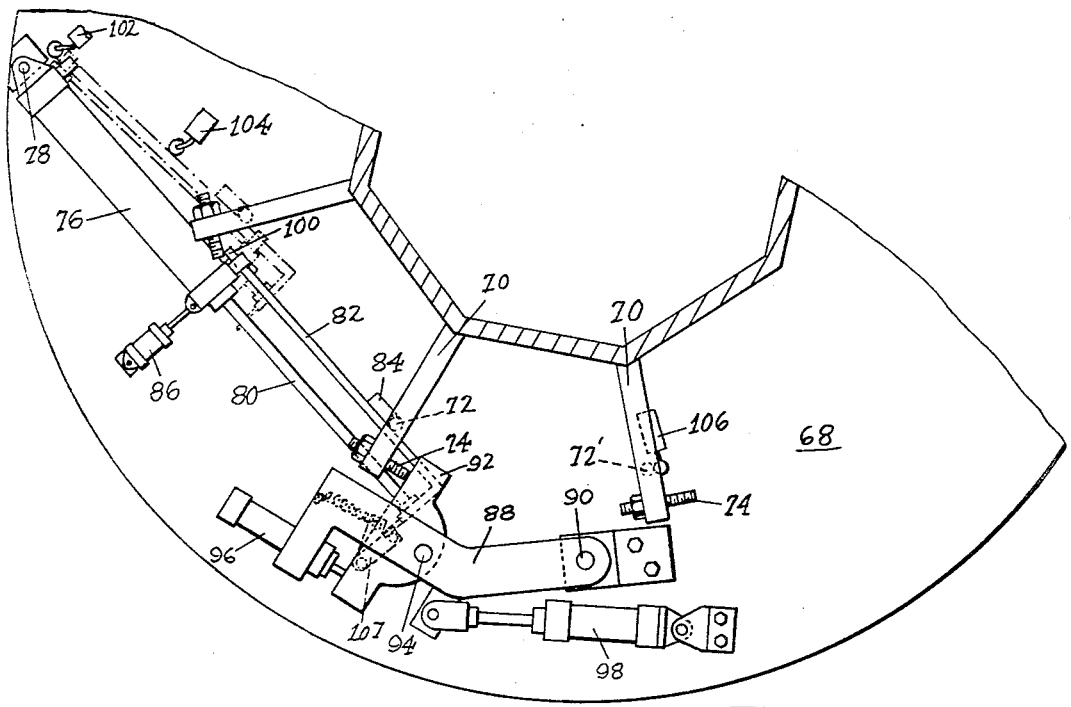
FIGURE 4 is a plan view of the indexing and stop mechanism.

Referring now to FIGURE 4, the means for intermittently moving the carrier and mold receiving fixtures will be described. It will be understood that FIGURE 4 is a plan view looking down on the top surface 68 of the base 24, with the carrier 10 removed. It will be understood however that the arms 70 will be suitably secured to the under side of the carrier 10, and one such arm 70 will be provided for each fixture carried by the carrier.

The arm 70 includes the driving lug 72 and the adjustable stop bolt 74.

Intermittent rotation of the carrier 10 is provided by the hydraulic cylinder 76 which is pivotally mounted as at 78 to the top surface 68 of the base of the device. The piston 80 of the hydraulic cylinder is secured to and carries with it the actuating rod 82, which in turn carries the driving block 84. The hydraulic cylinder 76 is movable by means of the small cylinder 86 between the full line position and the dotted line position shown in FIGURE 4.

The stop mechanism includes the main stop arm 88 which is pivotally secured to the surface 68 as at 90, the stop 92 which is pivotally mounted as at 94 to the arm 88, the shock absorber 96, and the hydraulic cylinder 98. The hydraulic cylinder 98 serves to pivot the arm 88 about the point 90 from the full line position shown in FIGURE 4 to a position wherein the stop 92 is spaced outwardly from the adjustable stop bolt 74.

In the preferred embodiment of the invention, the sequencing and operation of the driving and stop mechanism just described will be as follows. In the at rest position, the parts will be in the full line positions indicated in FIGURE 4. That is, the driving block 84 will be engaged with one of the driving lugs 72, and the adjustable stop bolt will be in contact with the stop 92. At this time, a poured mold is removed from the fixture at station 7 and a new mold is introduced to the fixture at station 1. When both the walking beam conveyors 18 and 22 have been retracted from the respective mold receiving fixtures, a suitable limit switch will be actuated, which, through conventional valving (not shown) serves to initiate retraction of the piston 80 within the cylinder 76, bringing it to such a position that the end 100 of the actuator rod 82 contacts the limit switch 102. Actuation of this limit switch, through conventional valving (not shown) actuates the hydraulic cylinder 86 to move the cylinder 76 into the dotted line position of FIGURE 4, wherein the driving block 84 engages the next successive driving lug 72. Inward movement of the cylinder 76 will actuate the limit switch 104 which accomplishes two functions. Actuation of this switch, again through conventional valving (not shown) causes the cylinder 98 to retract, moving the stop 92 out of engagement with the bolt 74, and also starts the indexing stroke of the cylinder 76. This causes the carrier and mold receiving fixtures to be rotated about the central axis one unit increment. Very shortly before the end of this movement, the driving lug indicated at 72' in FIGURE 4 will contact the limit switch 106, which will cause the stop mechanism to swing once again into the position indicated in FIGURE 4. Upon arrival at the stop position, the piston 80 contacts the limit switch 107, which starts the automatic pouring machine referred to earlier.

It will be recalled that in the preferred embodiment of the invention, actuation of the clamping diaphragm means, and actuation of the hydraulic cylinders for tilting and untilting the mold receiving fixtures is accomplished or controlled by rotation of the carrier 10. To this end, the pivot 12 is supplied with an air inlet 108, an hydraulic discharge 110, and an hydraulic supply 112. These various lines all communicate with the rotatable sleeve 114 which has, for each mold receiving fixture, an hydraulic pressure line 116, an hydraulic discharge line 118, and a pneumatic pressure line 120. As clearly shown in FIGURE 1, these various lines 116, 118, and 120 pass through openings in the carrier 110, to the valve structures shown schematically in FIGURE 5. That is, with respect to each mold receiving fixture there is a four-way valve indicated generally in FIGURE 5 at 122, and a three-way valve indicated generally at 124. The hydraulic pressure and discharge lines 116 and 118 are connected through the four-way valve 122 to the lines 118' and 116' which in turn are connected to the hydraulic cylinder 66. The air supply line 120 is connected through the three-way valve 124 to the line 120' which in turn is connected to the diaphragm means associated with the upper clamping member. The three-way valve 124 also serves to open the line 120' from the diaphragm means to atmosphere.

Figure 5:
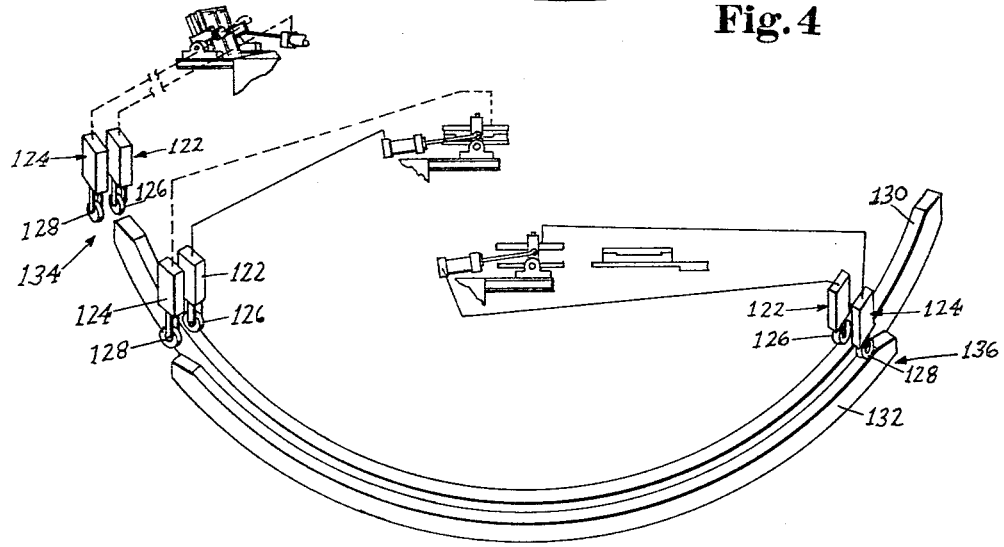
FIGURE 5 is a perspective view of a portion of the underside of the apparatus shown in FIGURE 1, showing the table support, valve, and cam arrangements.

Referring to FIGURE 5, it will be seen that each of the valves 122 and 124 includes the depending rollers 126 and 128 respectively which are adapted to engage and be actuated by the curved cam tracks 130 and 132. These cam tracks will be secured in any suitable manner to the surface 68 of the base 24.

Under normal operating circumstances, the valve 122 will connect the hydraulic pressure line 116 and 116' to move the piston 64 to its retracted position in which the mold receiving fixture is in the substantially vertical position. At the same time, the passage or tube 120 is normally connected through the valve 124 to the line 120', in order that the diaphragm is urged into clamping relation with the mold contained in the fixture.

When any given mold receiving fixture is located at station 6 as shown in FIGURE 1, the valve 122 and 124 associated with that station will be disposed relative to the cams 130 and 132 in the position indicated by the arrow 134 in FIGURE 5. That is, neither the roller 126 nor 128 has contacted its respective cam surface.

Immediately upon leaving station 6, it will be observed that the roller 126 contacts the cam 130. This will place the hydraulic pressure line 116' in connection with the hydraulic discharge line 118, and place the line 118' in connection with the hydraulic pressure line 116, forcing the piston 64 to its extended position, which brings the mold receiving fixture 14 to the horizontal position.

When the mold receiving fixture reaches the horizontal position, the roller 128 of the valve 124 will contact the cam 132. This will prevent communication between the pneumatic pressure line 120 and the line 120', and at the same time vent the line 120' to atmosphere, allowing the springs 54 to unclamp the diaphragm by urging the platen 46 against the upper clamping member 42.

The components remain in this position as the carrier 10 indexes this fixture through stations 7 and 8, and to station 1, wherein a new mold is loaded into the fixture. Upon leaving station 1, it will be observed that the roller 128 of valve 124 drops off the cam 132. As explained before, this reintroduces air under pressure to the diaphragm, securely clamping the mold in position. Very shortly thereafter, the roller 126 of the valve 122 will leave track 130, thereby reversing the valve 122 and tilting the mold fixture (by means of the cylinder 66) to the substantially vertical position by the time the fixture reaches the pouring station.

It is believed that the operation of the device will be clear from the foregoing discussion.

Figure 6:
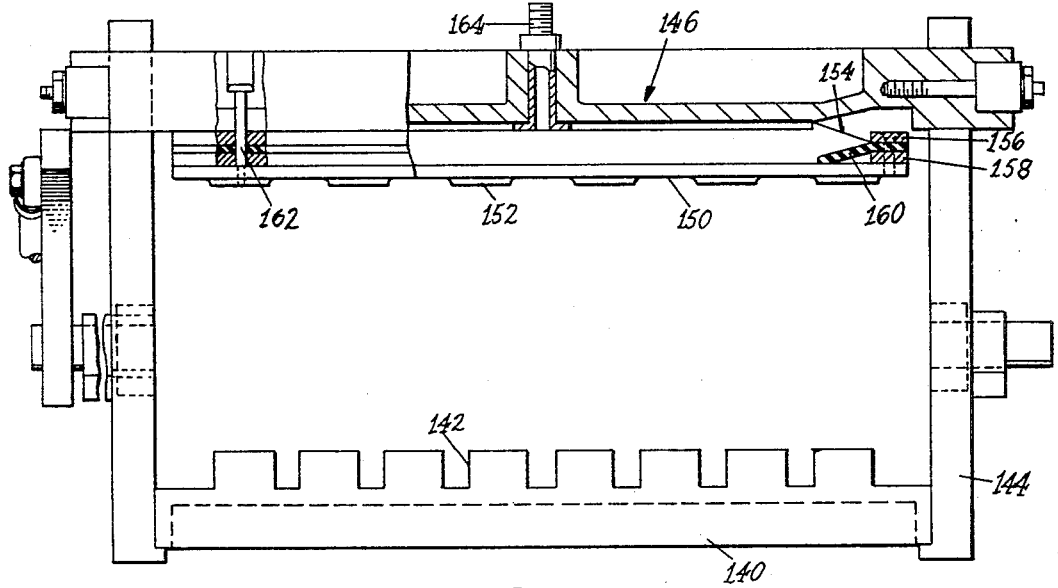
FIGURE 6 is an end elevation similar to FIGURE 2, but showing a modification of the clamping fixture of the invention.
Figure 7:
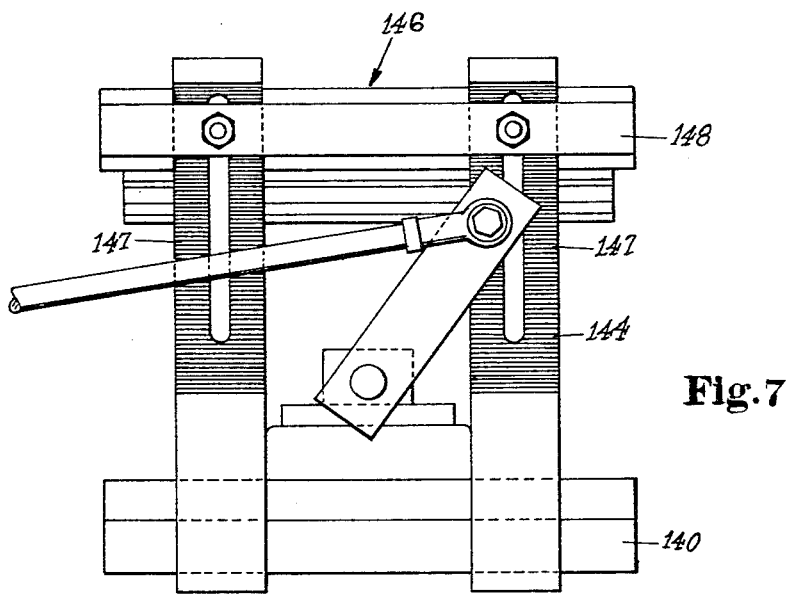
FIGURE 7 is a side elevational view of the fixture of FIGURE 6.

Turning now to FIGURES 6 and 7, a modified form of the mold receiving fixtures will be described. This fixture includes the base 140 which is provided with the slots 142 to accommodate the walking beam conveyor. Secured to the sides of the base 140 are the upstanding side members 144 which, as seen in FIGURE 7, are generally H shaped in configuration. The upper clamping member indicated generally at 146 is provided with slots along its side edges to accommodate the legs of the side members 144. The clamping bar 148 is then bolted to the upper clamping member 146 through slots in the side members 144, to thereby secure it any desired distance from the base 140. Preferably, both the side members 144 and the clamping bar 148 will have their mating surfaces serrated as at 147 along lines parallel to the base 144, in order to insure positive clamping and to accurately maintain parallelism between the base and the upper clamping member.

The diaphragm means of this modification again includes the upper clamping platen 150 which is preferably provided with the buttons 152. Again, this clamping platen is preferably formed of an "elastically bendable" material, such as a relatively thin sheet of steel or the like. Secured to the periphery of the clamping platen 150, and securing the clamping platen to the upper clamping member 146 is the diaphragm or elastomer 154. As is clearly shown in FIGURE 6, the diaphragm 154 may be secured to the clamping platen by engagement between the circumferential members 156 and 158. It will also be observed that insulating material 160 is disposed between the clamping platen 150 and the diaphragm 154. It is preferred that the insulating material be substantially coextensive with the diaphragm. It has been found that this feature is important in securing long life for the diaphragm, in as much as the clamping platen 150, in case of a broken or defective mold could come into direct contact with the molten metal.

It will also be noted that in this embodiment of the clamping fixture, a plurality of guide pins 162 extend between the clamping platen 150 and the upper clamping member 146. It should be noted however, that these guide pins are not spring biased. In this embodiment of the invention, the diaphragm will normally be held against the lower surface of the upper clamping member 146 by connecting the tube 164 to an exhauster or the like. The vacuum connection can readily be accomplished through the three-way valve which connects the diaphragm means to the source of air under pressure. That is, instead of connecting the conduit 164 with atmosphere, the valve serves to connect it with an exhauster.

Figure 8:
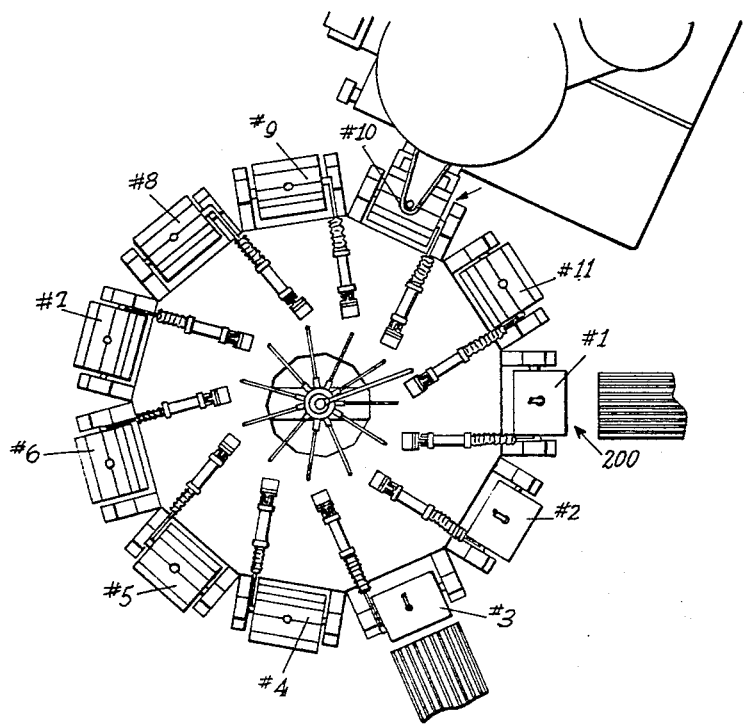
FIGURE 8 is a plan view of a modification of the invention.

Still another modification of the invention has been schematically illustrated in FIGURE 8. It is well known that in the casting of metals, a certain cooling or solidification time must elapse before the mold is tilted or otherwise handled, in order to insure uniformity of casting. In the embodiment shown above, this must be accomplished while the mold is at stations 3 through 6. It will, of course, be apparent that the dwell of each fixture at each station must be long enough so that the total time elapsed while a mold moves from station 2 to station 7 is equal to or longer than the solidification time for the metal being used.

In many applications, it is desirable to operate the casting conveyor of this invention more rapidly than can be accomplished with the 8 station unit of FIGURE 1. This has been accomplished with the apparatus of FIGURE 8 which includes eleven fixtures numbered 1–11, counter clockwise. The driving and stop mechanism is so arranged as to rotate the carrier and fixtures an angular distance equal to the distance between alternate fixtures. That is, fixture number 1 will move from the loading station (its present location) to the pouring station (the station where fixture number 10 is presently located), and so on. Stated another way, each odd numbered fixture in succession, and then each even numbered in succession will be presented to any given station. Or, in still another way, each fixture will be presented to a given station once in each two revolutions of the carrier.

In the embodiment illustrated, it will be apparent that, after leaving the pouring station, each fixture will go through 9 solidification stations (in succession, the stations presently occupied by fixtures number 8, 6, 4, 2, 11, 9, 7, 5, and 3).

Numerous other modifications and changes may be made in this invention without departing from its scope and spirit. Accordingly while various specific embodiments of the invention have been described, no limitation is to be found or inferred, except insofar as specifically set forth in the following claims.

The embodiments of the invention in which an exclusive property or privilege is claimed are defined as follows:

1. In a casting conveyor including a traversable carrier and a plurality of mold receiving fixtures mounted thereon, the improved fixture comprising:
    (a) a base;
    (b) a pair of upright side members secured to said base;
    (c) a hollow upper clamping member;
    (d) means releasably securing said upper clamping member to said upright side members;
    (e) diaphragm means secured to the lower surface of said upper clamping member;
    (f) means normally maintaining said diaphragm means against said clamping member; and
    (g) pneumatic means for extending said diaphragm means toward said base.

2. The improved fixture claimed in claim 1 wherein said means for normally maintaining said diaphragm means against said upper clamping member comprises a plurality of springs.

3. The improved fixture claimed in claim 1 wherein said means for normally maintaining said diaphragm means against said upper clamping member comprises means for maintaining a vacuum in said hollow upper clamping member.

4. The improved fixture claimed in claim 1 wherein said pneumatic means for extending said diaphragm means towards said base includes a valve actuated by movement of said carrier.

5. The improved fixture claimed in claim 1 wherein said diaphragm means includes an elastically bendable clamping platen and resilient means secured to the periphery of said clamping platen and securing said platen to said hollow upper clamping member.

6. The improved fixture claimed in claim 5 including insulating means disposed between said upper clamping member and said resilient means, said insulating means being substantially coextensive with said resilient means.

7. The conveyor claimed in claim 1 wherein said plurality of fixtures are equally spaced from one another in a circle and consist of an odd number greater than one; and wherein each increment of the intermittent rotation of said carrier is equal to the angular distance between alternate fixtures, whereby each fixture will be presented to a given station once in two complete revolutions of said carrier.

8. A casting conveyor comprising:
    (a) a traversable carrier;
    (b) means for intermittently moving said carrier;
    (c) a plurality of mold receiving fixtures pivotally secured to said carrier, each said mold receiving fixture comprising:
        (i) a base;
        (ii) a hollow upper clamping member normally maintained in fixed spaced apart relation to said base;
        (iii) diaphragm means secured to the lower surface of said upper clamping member;
        (iv) means normally maintaining said diaphragm against said upper clamping member; and
        (v) pneumatic means for extending said diaphragm means toward said base; and
    (d) fluid means for sequentially pivoting said mold receiving fixtures from a generally horizontal position to a generally vertical position, and back to said horizontal position.

9. The casting conveyor claimed in claim 8 wherein said pneumatic means includes valve control means for supplying pneumatic pressure to said diaphragm, said last mentioned valve control means being actuated by movement of said carrier.

10. The casting conveyor claimed in claim 9 wherein said diaphragm means includes an elastically bendable clamping platen and resilient means securing said clamping platen to said upper clamping member.

11. The casting conveyor claimed in claim 8 including insulating means disposed between said resilient means and said upper clamping member, said insulating means being substantially coextensive with said resilient means.

12. A casting conveyor according to claim 8 wherein said means for intermittently moving said carrier includes:
    (i) a driving lug on said carrier;
    (ii) hydraulic cylinder means engageable with said lug and extensible from an inoperative position to an extended position whereby to move said carrier;
    (iii) means for moving said cylinder means into engagement with said lug;
    (iv) means for extending said cylinder means;
    (v) stop means movable from a first position in the path of movement of said lug to a position spaced therefrom; and
    (vi) means for moving said stop means into and out of said position in the path of movement of said lug.

References Cited

UNITED STATES PATENTS

| | | | |
|---|---|---|---|
| 2,088,123 | 7/1937 | Toman | 269—22 |
| 2,192,133 | 2/1940 | Hagemeyer | 269—22 |
| 3,237,252 | 3/1966 | Ratcliffe | 164—343 |
| 311,902 | 2/1885 | Lewis | 222—505 |
| 2,843,895 | 7/1958 | Hallsworth | 164—327 |
| 2,893,057 | 7/1959 | Rekettye | 164—326 |
| 3,181,207 | 5/1965 | Schiable et al. | 164—160 |
| 3,209,414 | 10/1965 | Taccore | 164—171 |

J. SPENCER OVERHOLSER, *Primary Examiner.*

R. D. BALDWIN, *Assistant Examiner.*